US012782597B2

(12) United States Patent
Willis et al.

(10) Patent No.: US 12,782,597 B2
(45) Date of Patent: Nov. 3, 2026

(54) GAUGE LENGTH CORRECTION FOR SEISMIC ATTENUATION FROM DISTRIBUTED ACOUSTIC SYSTEM FIBER OPTIC DATA

(71) Applicant: Halliburton Energy Services, Inc., Houston, TX (US)

(72) Inventors: Mark Elliott Willis, Katy, TX (US); Oscar Barrios Lopez, Conroe, TX (US); Pedro William Palacios, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 76 days.

(21) Appl. No.: 17/191,506

(22) Filed: Mar. 3, 2021

(65) Prior Publication Data

US 2022/0283330 A1 Sep. 8, 2022

(51) Int. Cl.
*G01V 1/36* (2006.01)
*G01H 9/00* (2006.01)
(Continued)

(52) U.S. Cl.
CPC ............. *G01V 1/364* (2013.01); *G01H 9/004* (2013.01); *G01V 1/46* (2013.01); *E21B 47/00* (2013.01);
(Continued)

(58) Field of Classification Search
None
See application file for complete search history.

(56) References Cited

U.S. PATENT DOCUMENTS 5,724,307 A * 3/1998 Gaiser .................... G01V 1/284 367/21
8,982,671 B2 3/2015 Willis et al.
(Continued)

FOREIGN PATENT DOCUMENTS

CN 111665568 A * 9/2020
WO 2019005050 1/2019

OTHER PUBLICATIONS

Machine Translation for CN11166568A (Year: 2020).*
(Continued)

*Primary Examiner* — Arleen M Vazquez
*Assistant Examiner* — Leonard S Liang
(74) *Attorney, Agent, or Firm* — Michael Jenney; C. Tumey Law Group, PLLC

(57) ABSTRACT

A method for computing attenuation from seismic data. The method may include measuring one or more seismic events with a distributed acoustic sensing (DAS) system to form a well log of one or more traces. The method may further include isolating a first seismic event with a tapered windowing function, performing a spectral ratio of two or more pairs of traces in the well log, identifying a velocity at each of the one or more traces in the well log, identifying an analytic correction for a gauge of the DAS system, and applying the analytic correction to the spectral ratio to form a corrected spectral ratio. Additionally, the method may include identifying a slope of the corrected spectral ratio for at least a part of the well log, converting the slope to a Q value, and identifying one or more formation properties in a formation from the Q value.

18 Claims, 8 Drawing Sheets

(51) Int. Cl.

| | |
|---|---|
| ***G01V 1/46*** | (2006.01) |
| *E21B 47/00* | (2012.01) |
| *E21B 47/07* | (2012.01) |
| *E21B 47/107* | (2012.01) |
| *E21B 47/12* | (2012.01) |
| *E21B 47/135* | (2012.01) |
| *E21B 47/14* | (2006.01) |
| *E21B 49/00* | (2006.01) |
| *G01D 5/353* | (2006.01) |
| *G01V 1/00* | (2024.01) |
| *G01V 1/16* | (2006.01) |
| *G01V 1/22* | (2006.01) |
| *G01V 1/30* | (2006.01) |
| *G01V 1/40* | (2006.01) |
| *G01V 1/42* | (2006.01) |
| *G01V 1/48* | (2006.01) |
| *G01V 1/50* | (2006.01) |
| *G01V 1/52* | (2006.01) |
| *G01V 8/24* | (2006.01) |

(52) U.S. Cl.

CPC ............. *E21B 47/07* (2020.05); *E21B 47/107* (2020.05); *E21B 47/12* (2013.01); *E21B 47/135* (2020.05); *E21B 47/14* (2013.01); *E21B 49/00* (2013.01); *G01D 5/35361* (2013.01); *G01H 9/00* (2013.01); *G01V 1/00* (2013.01); *G01V 1/16* (2013.01); *G01V 1/22* (2013.01); *G01V 1/226* (2013.01); *G01V 1/301* (2013.01); *G01V 1/36* (2013.01); *G01V 1/40* (2013.01); *G01V 1/42* (2013.01); *G01V 1/48* (2013.01); *G01V 1/50* (2013.01); *G01V 1/52* (2013.01); *G01V 8/24* (2013.01); *G01V 2210/1429* (2013.01); *G01V 2210/161* (2013.01)

(56) References Cited

U.S. PATENT DOCUMENTS

| | | | | |
|---|---|---|---|---|
| 9,702,244 | B2 | 7/2017 | Willis et al. | |
| 9,797,243 | B2 | 10/2017 | Willis et al. | |
| 10,180,515 | B2 | 1/2019 | Ellmauthaler et al. | |
| 10,281,606 | B2 | 5/2019 | Erdemir et al. | |
| 10,324,212 | B2 | 6/2019 | Padhi et al. | |
| 10,401,519 | B2 | 9/2019 | Willis et al. | |
| 10,422,910 | B2 | 9/2019 | Willis | |
| 10,444,391 | B2 | 10/2019 | Ellmauthaler et al. | |
| 10,495,779 | B2 | 12/2019 | LeBlanc et al. | |
| 12,196,907 | B2 * | 1/2025 | Tian | G01V 1/48 |
| 2004/0122596 | A1 * | 6/2004 | Sudhakar | G01V 1/42 702/17 |
| 2009/0103100 | A1 * | 4/2009 | Froggatt | G01M 11/083 356/477 |
| 2011/0273961 | A1 * | 11/2011 | Hu | G01V 1/301 367/47 |
| 2012/0195164 | A1 * | 8/2012 | Meersman | G01V 1/28 367/43 |
| 2012/0278043 | A1 * | 11/2012 | Lewis | G01H 9/004 702/189 |
| 2014/0153364 | A1 * | 6/2014 | Lewis | G01V 1/366 367/41 |
| 2014/0198617 | A1 * | 7/2014 | Noui-Mehidi | E21B 47/18 367/81 |
| 2014/0336940 | A1 * | 11/2014 | Bettinelli | G01V 1/306 702/14 |
| 2015/0369591 | A1 | 12/2015 | Goldner et al. | |
| 2016/0178772 | A1 * | 6/2016 | Carter | G01V 1/306 702/17 |
| 2016/0191163 | A1 * | 6/2016 | Preston | G01L 1/242 398/16 |
| 2016/0245077 | A1 | 8/2016 | Willis et al. | |
| 2016/0265345 | A1 * | 9/2016 | In 'T Panhuis | E21B 47/107 |
| 2016/0290847 | A1 * | 10/2016 | Gronsberg | E21B 47/16 |
| 2017/0199294 | A1 * | 7/2017 | Xia | G01V 1/226 |
| 2017/0235006 | A1 * | 8/2017 | Ellmauthaler | G01V 1/42 702/6 |
| 2017/0260849 | A1 * | 9/2017 | Friehauf | E21B 43/26 |
| 2018/0128094 | A1 * | 5/2018 | Merciu | E21B 47/005 |
| 2018/0329099 | A1 * | 11/2018 | Erdimer | G01H 9/004 |
| 2019/0238178 | A1 * | 8/2019 | Huang | H04B 1/715 |
| 2019/0331819 | A1 | 10/2019 | Wu et al. | |
| 2020/0190971 | A1 | 6/2020 | Thiruvenkatanathan | |
| 2020/0271811 | A1 * | 8/2020 | Wilson | G01V 1/48 |
| 2020/0284937 | A1 * | 9/2020 | Zhang | G06N 3/0464 |
| 2020/0333487 | A1 | 10/2020 | Padhi et al. | |
| 2021/0132206 | A1 * | 5/2021 | Baksmaty | G01N 29/032 |
| 2022/0221602 | A1 * | 7/2022 | Johannessen | G01D 5/35374 |
| 2022/0283021 | A1 * | 9/2022 | Jiang | G01D 5/35329 |

OTHER PUBLICATIONS

Parra, J.O., Hackert, C.L., Wilson, L, Collier, H.A., and Thomas, J.T. 2006. Q as a lithological/hydrocarbon indicator: from full waveform sonic to 3D surface seismic. US Department of Energy Final Project Report. DOE Contract No. DE-FC26-02NT15343 (Year: 2006).*

Pierre, Bettinelli and Le Calvez, Joel—"From Geophone to DAS: Evolution of Q Estimation"; This Paper was prepared for presentation at the International Petroleum Technology Conference held in Dhahran, Saudi Arabia, Jan. 13-15, 2020. (Year: 2020).*

Dietrich, Michel and Bouchon, Michel—"Measurements of attenuation from vertical seismic profiles by iterative modeling"; Geophysics, vol. 50, No. 6 (Jun. 1985) p. 931-949. (Year: 1985).*

Zhang, Minyu; Zhao, Xiaomin; Wilson, Glenn A; Willis, Mark E; and Barrios, Oscar—"Q Estimation from Geophone and DAS VSPs" ; SEG International Exposition and 90th Annual Meeting (2020). (Year: 2020).*

Kerner, Claudia and Harris, Peter E—"Scattering attenuation in sediments modeled by ARMA processes—Validation of simple Q models"; Geophysics, vol. 59, No. 12 (Dec. 1994); p. 1813-1826. (Year: 1994).*

International Search Report and Written Opinion for Application No. PCT/US2021/023733, dated Dec. 1, 2021.

SLB—DAS VSP Q.

We A5 16—The determination of the seismic quality factor Q from VSP data acquired using distributed acoustic sensing, 2017, T. Dean and J. Correa, EAGE Paris Annual Meeting.

Iptc, Pierre, et al., From geophone to DAS: evolution of Q estimation, International Petroleum Technology Conference, 2020.

10.1190/segam2020-3416667.1—Q estimation from geophone and DAS VSPs, 2020, M Zhang, X Zhjao, G. Wilson, ME Willis, O. Barrios, SEG Annual Meeting.

Segam2015-5800169.1—New method of Q-factor estimation applied to optical fiber VSP data, 2015, P. Bettinelli and J-C Puech, SEG Annual Meeting.

* cited by examiner

GAUGE LENGTH CORRECTION FOR SEISMIC ATTENUATION FROM DISTRIBUTED ACOUSTIC SYSTEM FIBER OPTIC DATA

BACKGROUND

Bore holes drilled into subterranean formations may enable recovery of desirable fluids (e.g., hydrocarbons) or disposal and injection of fluids (e.g., carbon dioxide or water) using a number of different techniques. Knowing the type of formation during drilling operations may be beneficial to operators as a bottom hole assembly traverses through different formations. For example, currently after the conclusion of drilling operations, a wireline system, distributed acoustic sensing (DAS) system, may be disposed within the borehole and measurements may be taken, covering a specific depth range. A vibration source, disposed on the surface, may be activated to cast seismic waves into formations below. A fiberoptic system may detect and allow the recording of the seismic waves as they traverse and/or reflect through the formation. The processing of the recording signals may be used to produce a profile of seismic velocity for the rock formations traversed by the waves, which may improve the identification of the rock formations or to measure various rock properties. This process of measuring and recording the wavefield of seismic waves at detectors (either by geophones, hydrophones, accelerometers, or a fiber optic cable system) in the borehole forms a vertical seismic profile (VSP). A VSP recording may be repeated at different points in time to extract time lapse measurements to characterize changes of the rock properties due to production of formation fluids, subsidence of the overburden, and injection of fluids into the reservoir, for example.

However, computing attenuation of the seismic waves over a depth interval from seismic data is always challenging because the losses over short distances, which correspond to a few wavelengths, are usually not very large. Thus, detecting and characterizing the losses due to noise and gauge length biases make it difficult to properly calibrate the response of a VSP for extracting a reliable measurement of the seismic attenuation property.

BRIEF DESCRIPTION OF THE DRAWINGS

These drawings illustrate certain aspects of some examples of the present disclosure and should not be used to limit or define the disclosure.

DETAILED DESCRIPTION

This disclosure relates to use of distributed acoustic sensing ("DAS") systems in a downhole environment. Examples may provide systems and methods for a methodology to invert picked waveforms of the direct wave, and other events, recorded on a DAS VSP data set to compute attenuation from seismic data. Described below are methods and systems that describe ways of increasing the signal-to-noise-ratio (SNR) of the data and extracting the attenuation. By computing seismic losses, rock properties may be determined.

Figure 1:
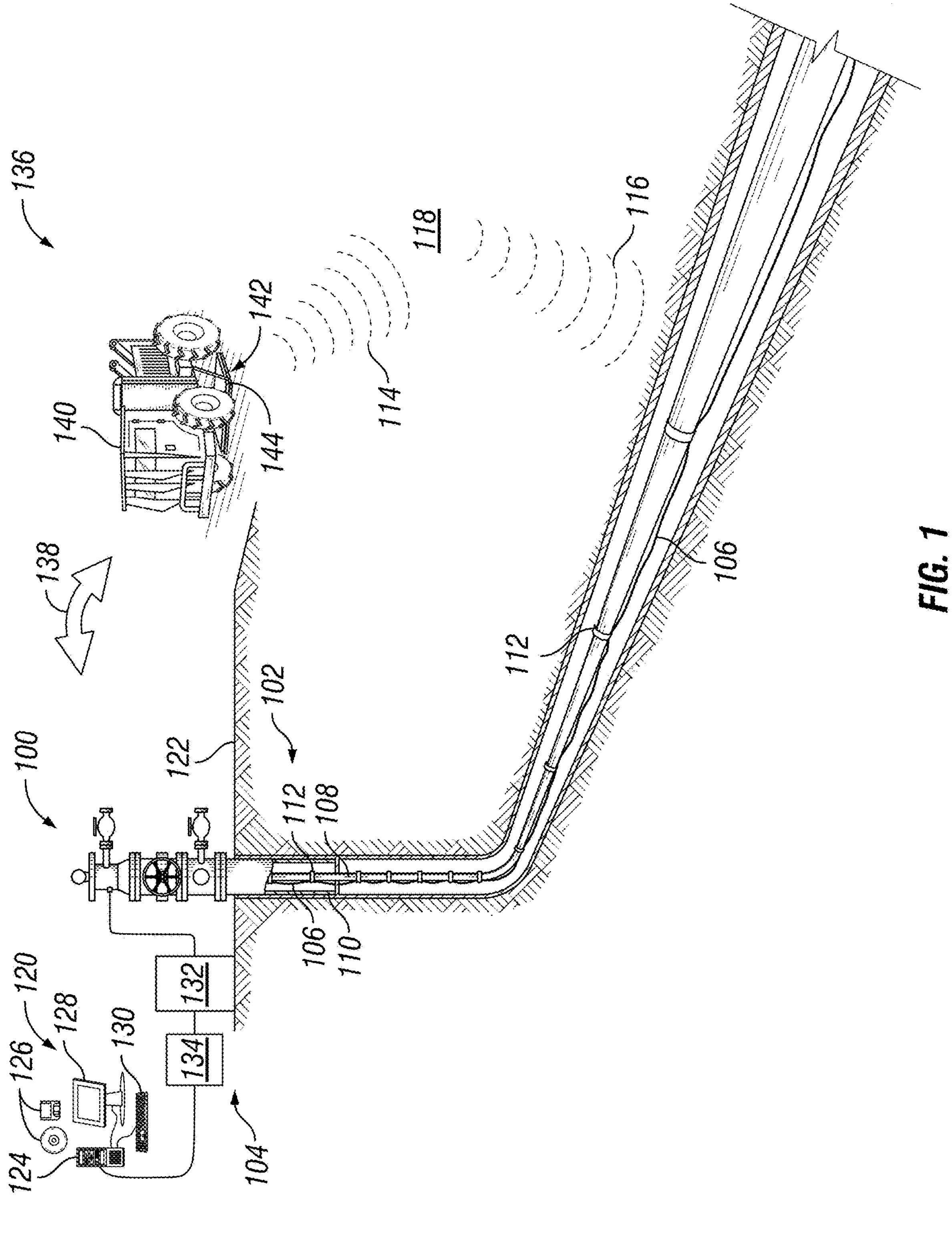
FIG. 1 illustrates an example of a distributed acoustic sensing (DAS) system operating on a well system.

FIG. 1 generally illustrates an example of a well system 100 that may be used in a wellbore 102, which may include DAS system 104. It should be noted that well system 100 may be one example of a wide variety of well systems in which the principles of this disclosure may be utilized. Accordingly, it should be understood that the principles of this disclosure may not be limited to any of the details of the depicted well system 100, or the various components thereof, depicted in the drawings or otherwise described herein. For example, it is not necessary in keeping with the principles of this disclosure for completed well system 100 to include a generally vertical wellbore section and/or a generally horizontal wellbore section. Moreover, it is not necessary for formation fluids to be only produced from subterranean formation 118 since, in other examples, fluids may be injected into subterranean formation 118, or fluids may be both injected into and produced from subterranean formation 118, without departing from the scope of the disclosure. Additionally, wellbore 102 may be a producing well, an injection well, a recovery well, and/or an uncompleted well. Further, while FIG. 1 generally depicts land-based system, those skilled in the art will readily recognize that the principles described herein are equally applicable to a subsea operation, without departing from the scope of the disclosure.

In FIG. 1, DAS system 104 may be disposed along production tubing 108 and further within casing 110. As disclosed below, DAS system 104 may be permanently installed, semi-permanently installed, or temporally deployed in a wireline system, slickline system, coiled tubing system, bare fiber, and/or the like. DAS system 104 may include a fiber optic cable 106. Fiber optic cable 106 may be single mode, multi-mode, or a plurality thereof. In examples, fiber optic cable 106 may be permanently installed and/or temporarily installed in wellbore 102. Without limitation, DAS system 104 may operate and function to measure and produce a time-lapse vertical seismic profile ("VSP"). Light may be launched into the fiber optic cable 106 from surface 122 with light returned via the same fiber optic cable 106 detected at the surface 122. DAS system 104 may detect acoustic energy along the fiber optic cable 106 from the detected light returned to the surface 122. For example, measurement of backscattered light (e.g., Rayleigh backscattering) can be used to detect the acoustic energy (e.g., seismic waves 114 or reflected seismic waves 116). In additional examples, Bragg Grating or other suitable device can be used with the fiber optic cable 106 for detection of acoustic energy along the fiber optic cable. While FIG. 1 describes DAS system 104 and use of fiber optic cable 106 as the subsurface sensory array for detection of acoustic energy, it should be understood that examples may include other techniques for detection of acoustic energy in wellbore 102. In examples, fiber optic cable 106 may be clamped to production tubing 108. However, fiber optic cable 106 may be clamped to production tubing through connection device 112 by any suitable means. It should be noted that fiber optic cable 106 may also be cemented in place within casing 110 and/or attached to casing 110 by any suitable means. Additionally, fiber optic cable 106 may be attached to coil tubing and/or a conveyance.

A conveyance may include any suitable means for providing mechanical conveyance for fiber optic cable 106, including, but not limited to, wireline, slickline, pipe, drill pipe, downhole tractor, or the like. In some embodiments, the conveyance may provide mechanical suspension, as well as electrical connectivity, for fiber optic cable 106. The conveyance may comprise, in some instances, a plurality of electrical conductors extending from surface 122. The conveyance may comprise an inner core of seven electrical conductors covered by an insulating wrap. An inner and outer steel armor sheath may be wrapped in a helix in opposite directions around the conductors. The electrical conductors may be used for communicating power and telemetry to surface 122. Information from fiber optic cable 106 may be gathered and/or processed by information handling system 120, discussed below. For example, signals recorded by fiber optic cable 106 may be stored on memory and then processed by information handling system 120. The processing may be performed real-time during data acquisition or after recovery of fiber optic cable 106. Processing may alternatively occur downhole or may occur both downhole and at surface. In some embodiments, signals recorded by fiber optic cable 106 may be conducted to information handling system 120 by way of the conveyance. Information handling system 120 may process the signals, and the information contained therein may be displayed for an operator to observe and stored for future processing and reference. Without limitation, fiber optic cable 106 may be attached to coil tubing and/or the conveyance by any suitable means. Coil tubing and the conveyance may be disposed within production tubing 108 and/or wellbore 102 by any suitable means.

Figures 6A, 6B, 6C, 6D, 6E, 6F:
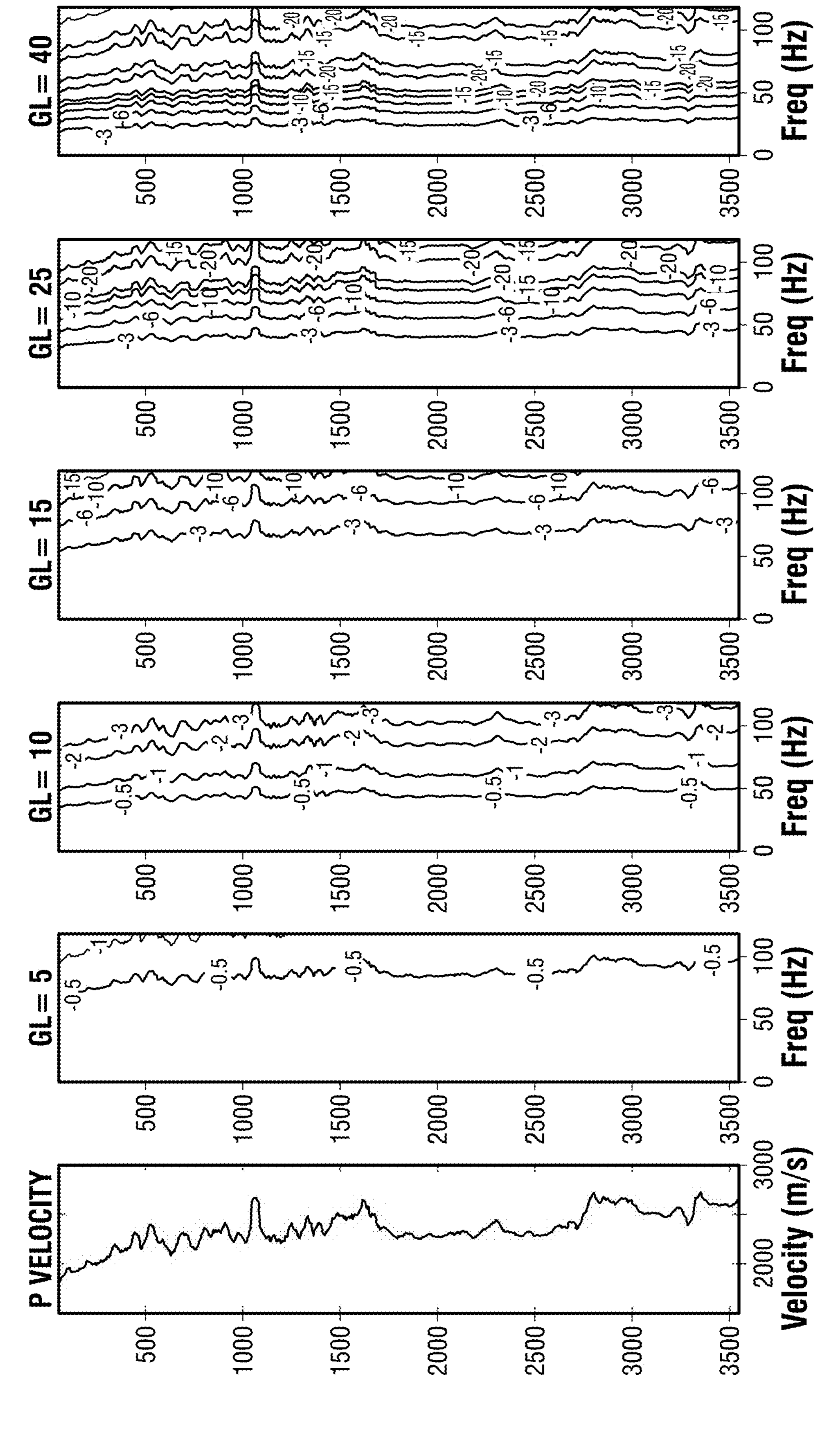
FIGS. 6A-6F illustrate spectral losses with different gauge lengths in the well log using contour lines.

FIGS. 2A-2D illustrates different examples of deployment of fiber optic cable 106 in wellbore 102. As illustrated in FIG. 6A, wellbore 102 deployed subterranean formation 118 may include surface casing 200 in which production casing 202 may be deployed. Additionally, production tubing 204 may be deployed within production casing 202. In this example, fiber optic cable 106 may be temporarily deployed in a wireline system in which a bottom hole gauge 208 is connected to the distal end of fiber optic cable 106. Further illustrated, fiber optic cable 106 may be coupled to a fiber connection 206. Fiber connection 206 may operate with an optical feedthrough system (itself comprising a series of wet- and dry-mate optical connectors) in the wellhead that may optically couple fiber optic cable 106 from the tubing hanger to the wellhead instrument panel.

Figures 2A, 2B, 2C, 2D:
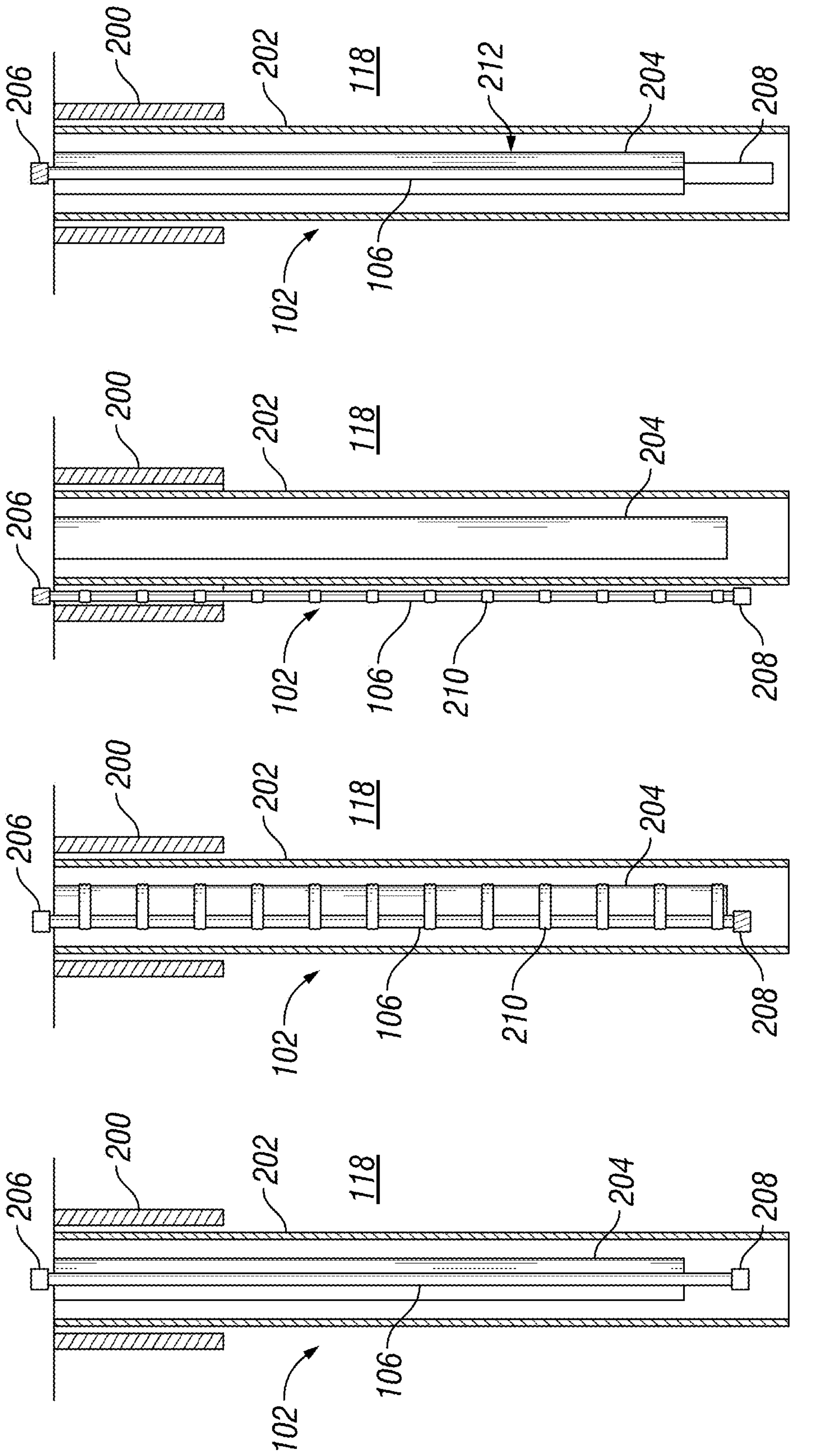
FIGS. 2A-2D illustrate different examples of a fiber optic cable deployed downhole in a distributed acoustic sensing system.

FIG. 2B illustrates a permeant deployment of fiber optic cable 106. As illustrated in wellbore 102 deployed in subterranean formation 118 may include surface casing 200 in which production casing 202 may be deployed. Additionally, production tubing 204 may be deployed within production casing 202. In examples, fiber optic cable 106 is attached to the outside of production tubing 204 by one or more cross-coupling protectors 210. Without limitation, cross-coupling protectors 210 may be evenly spaced and may be disposed on every other joint of production tubing 204. Further illustrated, fiber optic cable 106 may be coupled to fiber connection 206 at one end and bottom hole gauge 208 at the opposite end.

FIG. 2C illustrates a permanent deployment of fiber optic cable 106. As illustrated in wellbore 102 deployed in subterranean formation 118 may include surface casing 200 in which production casing 202 may be deployed. Additionally, production tubing 204 may be deployed within production casing 202. In examples, fiber optic cable 106 is attached to the outside of production casing 202 by one or more cross-coupling, protectors 210. Without limitation, cross-coupling protectors 210 may be evenly spaced and ma be disposed on every other joint of production tubing 204. Further illustrated, fiber optic cable 106 may be coupled to fiber connection 206 at one end and bottom hole gauge 208 at the opposite end.

FIG. 2D illustrates a coiled tubing operation in which fiber optic cable 106 may be deployed temporarily. As illustrated in FIG. 2D, wellbore 102 deployed in subterranean formation 118 may include surface casing 200 in which production casing 202 may be deployed. Additionally, coiled tubing 212 may be deployed within production casing 202. In this example, fiber optic cable 106 may be temporarily deployed in a coiled tubing system in which a bottom hole gauge 208 is connected to the distal end of downhole fiber. Further illustrated, fiber optic cable 106 may be attached to coiled tubing 212, which may move fiber optic cable 106 through production casing 202, Further illustrated, fiber optic cable 106 may be coupled to fiber connection 206 at one end and bottom hole gauge 208 at the opposite end. During operations, fiber optic cable 106 may be used to take measurements within wellbore 102, which may be transmitted to the surface for further processing.

Referring back to FIG. 1, DAS system 104 may function and operate to measure seismic waves 114 and/or reflected seismic waves 116. Seismic waves 116 may illuminate elements (not illustrated) in formation 118. Seismic waves 114 and/or reflected seismic waves 116 may induce a dynamic strain signal in fiber optic cable 106, which may be recorded by the DAS system on information handling system 120. Measuring dynamic strain in fiber optic cable 106 may include a strain measurement, fiber curvature measurement, fiber temperature measurement, and/or energy of backscattered light measurement. A strain measurement may be performed by an operation of Brillouin scattering (via Brillouin Optical Time-Domain Reflectometry, BOTDR, or Brillouin Optical Time-Domain Analysis, BOTDA), or Rayleigh scattering utilizing Optical Frequency Domain Reflectometry (OFDR). A Fiber curvature measurement may be performed using Polarization Optical Time Domain Reflectometry (P-OTDR) or Polarization-Optical Frequency Domain Reflectometry (P-OFDR). A Fiber temperature measurement may be performed utilizing Raman DTS. An energy of backscattered light of DAS measurement may be performed utilizing an automatic thresholding scheme, the fiber end is set to the DAS channel for which the backscattered light energy flat lines. The purpose of all these measurements may be to compute the structure and properties of formation 118 at different times. This may allow an operator to perform reservoir monitoring.

Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit 124 (CPU) or hardware or software control logic, ROM, and/or other types of nonvolatile memory. Additional components of the information handling system 120 may include one or more disk drives 126, output devices 128, such as a video display, and one or more network ports for communication with external devices as well as an input device 130 (e.g., keyboard, mouse, etc.). Information handling system 120 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling system 120 may be connected to DAS system which may further include a single mode—multimode ("SM-MM") converter 132 and a Fiber Vertical Seismic Profile ("VSP") interrogator 134. SM-MM converter 132 may be used to convert between a single mode and a multimode for fiber communication. Fiber VSP interrogator 134 may be used to emit light pulses into the fiber optic cable 106 and translate the backscattered light pulses to digital information, which may be read by information handling system 120. In examples, information handling system 120 may communicate with DAS system 104 and act as a data processing system that analyzes measured and/or collected information. This processing may occur at surface 122 in real-time. Alternatively, the processing may occur at surface 122 and/or at another location.

It should be noted that information handling system 120 may be connected to DAS system 104. Without limitation, information handling system 120 may be a hard connection or a wireless connection 138. Information handling system 120 may record and/or process measurements from DAS system 104 individually and/or at the same time.

Seismic system 136 may include a seismic source 142. As illustrated, a vehicle 140 may house the seismic source 142. Seismic source 142 may be used to propagate seismic waves into subterranean formations 118. Without limitations, seismic source 142 may be a compressional source or a shear source. In examples, seismic source 142 may a truck-mounted seismic vibrator. However, without limitation, seismic source 142 may also include an air gun, an explosive device, a vibroseis, and/or the like. As illustrated, seismic source 142 may include a baseplate 144 that may be lowered so as to be in contact with the ground. Vibrations of controlled and varying frequency may be imparted to the ground through baseplate 144. When the survey is completed, baseplate 144 may be raised, which may allow so seismic source 142 and vehicle 140 to move to another location.

During measurement operations, information handling system 120 may take into account reflected seismic waves 116 to produce a VSP. In one example, the seismic refraction data may be processed into a near-surface velocity model. Information handling system 120 may update the near-surface velocity model for seismic tomographic reconstruction (i.e., either travel time or waveform data). Further, information handling system 120 may update the travel time used for travel time tomographic reconstruction of the near-surface velocity model. This information may be used for reservoir monitoring over any length of time.

Figure 3:
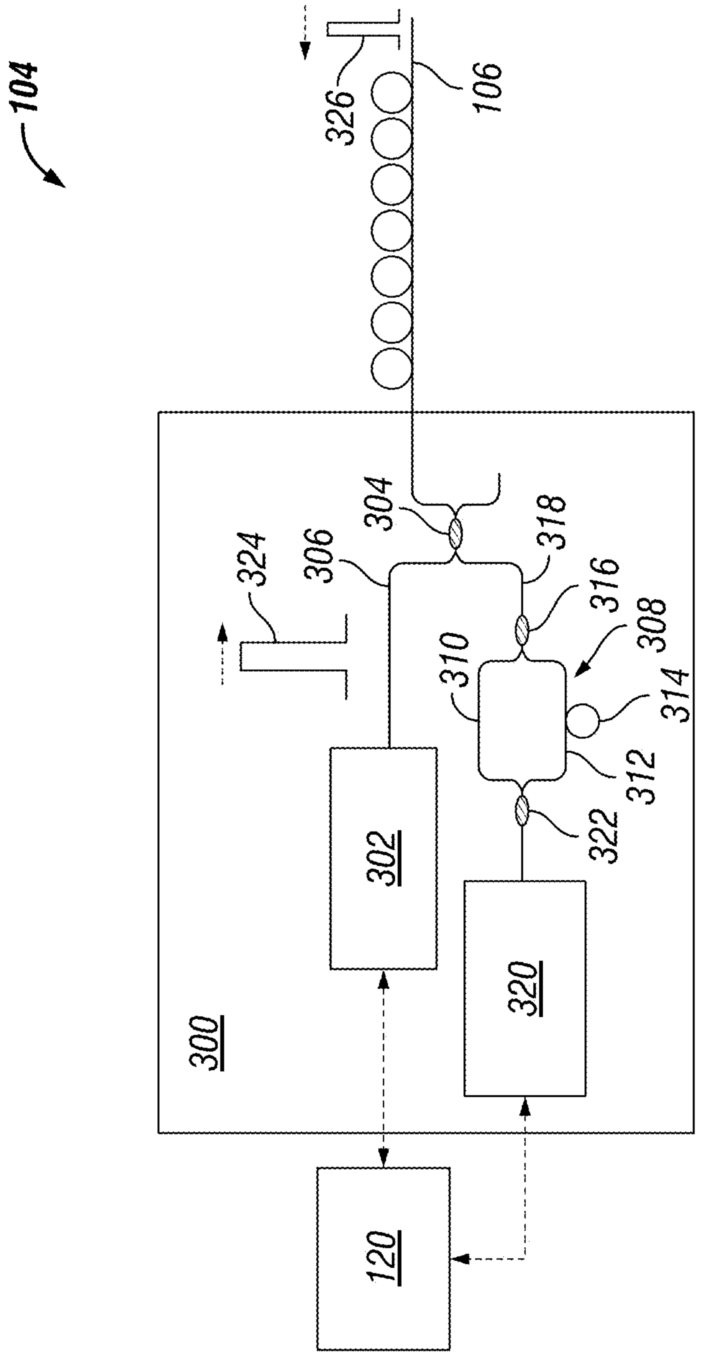
FIG. 3 illustrates and examples of a DAS system.

FIG. 3 illustrates an example of DAS system 104. DAS system 104 may include information handling system 120 that is communicatively coupled to interrogator 300. Without limitation, DAS system 104 may include a single-pulse coherent Rayleigh scattering system with a compensating interferometer. In examples, DAS system 104 may be used for phase-based sensing of events in a wellbore using measurements of coherent Rayleigh backscatter or may interrogate a fiber optic line containing an array of partial reflectors, for example, fiber Bragg gratings.

As illustrated in FIG. 3, interrogator 300 may include a pulse generator 302 coupled to a first coupler 304 using an optical fiber 306. Pulse generator 302 may be a laser, or a laser connected to at least one amplitude modulator, or a laser connected to at least one switching amplifier, i.e., semiconductor optical amplifier (SOA). First coupler 304 may be a traditional fused type fiber optic splitter, a circulator, a PLC fiber optic splitter, or any other type of splitter known to those with ordinary skill in the art. Pulse generator 302 may be coupled to optical gain elements (not shown) to amplify pulses generated therefrom. Example optical gain elements include, but are not limited to, Erbium Doped Fiber Amplifiers (EDFAs) or Semiconductor Optical Amplifiers (SOAs).

DAS system 104 may include an interferometer 308. Without limitations, interferometer 308 may include a Mach-Zehnder interferometer. For example, a Michelson interferometer or any other type of interferometer 308 may also be used without departing from the scope of the present disclosure. Interferometer 308 may include a top interferometer arm 310, a bottom interferometer arm 312, and a gauge 314 positioned on bottom interferometer arm 312. Interferometer 308 may be coupled to first coupler 304 through a second coupler 316 and a connecting optical fiber 318. Interferometer 308 further may be coupled to a photodetector assembly 320 of DAS system 104 through a third coupler 322 opposite second coupler 316. Second coupler 316 and third coupler 322 may be a traditional fused type fiber optic splitter, a PLC fiber optic splitter, or any other type of optical splitter known to those with ordinary skill in the art. Photodetector assembly 320 may include associated optics and signal processing electronics (not shown). Photodetector assembly 320 may be a semiconductor electronic device that uses the photoelectric effect to convert light to electricity. Photodetector assembly 320 may be an avalanche photodiode or a pin photodiode but is not intended to be limited to such.

When operating DAS system 104, pulse generator 302 may generate a first optical pulse 324 which is transmitted through optical fiber 306 to first coupler 304. First coupler 304 may direct first optical pulse 324 through a fiber optical cable 106. It should be noted that fiber optical cable 106 may be included in umbilical line and/or a downhole fiber (e.g., not illustrated). As illustrated, fiber optical cable 106 may be coupled to first coupler 304. As first optical pulse 324 travels through fiber optical cable 106, imperfections in fiber optical cable 106 may cause a portion of the light to be backscattered along fiber optical cable 106 due to Rayleigh scattering. Scattered light according to Rayleigh scattering is returned from every point along fiber optical cable 160 along the length of fiber optical cable 106 and is shown as backscattered light 326. This backscatter effect may be referred to as Rayleigh backscatter. Density fluctuations in fiber optical cable 106 may give rise to energy loss due to the scattered light, $\alpha_{scat}$, with the following coefficient:

$$\alpha_{scat} = \frac{8\pi^3}{3\lambda^4} n^8 p^2 k T_f \beta \quad (1)$$

where n is the refraction index, p is the photoelastic coefficient of fiber optical cable 106, k is the Boltzmann constant, and β is the isothermal compressibility. $T_f$ is a fictive temperature, representing the temperature at which the density fluctuations are "frozen" in the material. Fiber optical cable 160 may be terminated with a low reflection device (not shown). In examples, the low reflection device (not shown) may be a fiber coiled and tightly bent to violate Snell's law of total internal reflection such that all the remaining energy is sent out of fiber optical cable 106.

Backscattered light 326 may travel back through fiber optical cable 106, until it reaches first coupler 304. First coupler 304 may be coupled to second coupler 316 on one side by connecting optical fiber 318 such that backscattered light 326 may pass from first coupler 304 to second coupler 316 through optical fiber 232. Second coupler 316 may split backscattered light 326 based on the number of interferometer arms so that one portion of any backscattered light 326 passing through interferometer 308 travels through top interferometer arm 310 and another portion travels through bottom interferometer arm 312. Therefore, second coupler 316 may split the backscattered light 326 from connecting optical fiber 318 into a first backscattered pulse and a second backscattered pulse. The first backscattered pulse may be sent into top interferometer arm 310. The second backscattered pulse may be sent into bottom interferometer arm 312. These two portions may be re-combined at third coupler 322, after they have exited interferometer 308, to form an interferometric signal.

Interferometer 308 may facilitate the generation of the interferometric signal through the relative phase shift variations between the light pulses in top interferometer arm 310 and bottom interferometer arm 312. Specifically, gauge 314 may cause the length of bottom interferometer arm 312 to be longer than the length of top interferometer arm 310. With different lengths between the two arms of interferometer 308, the interferometric signal may include backscattered light 326 from two positions along fiber optical cable 106 such that a phase shift of backscattered light 326 between the two different points along fiber optical cable 106 may be identified in the interferometric signal. The distance between those points L may be half the length of the gauge 314 in the case of a Mach-Zehnder configuration, or equal to the gauge length in a Michelson interferometer configuration.

While DAS system 104 is running, the interferometric signal will typically vary over time. The variations in the interferometric signal may identify strains in fiber optical cable 106 that may be caused, for example, by seismic energy. By using the time of flight for first optical pulse 324, the location of the strain along fiber optical cable 160 and the time at which it occurred may be determined. If fiber optical cable 106 is positioned within a wellbore, the locations of the strains in fiber optical cable 106 may be correlated with depths in the formation in order to associate the seismic energy with locations in the formation and wellbore.

To facilitate the identification of strains in fiber optical cable 160, the interferometric signal may reach photodetector assembly 320, where it may be converted to an electrical signal. The photodetector assembly may provide an electric signal proportional to the square of the sum of the two electric fields from the two arms of the interferometer. This signal is proportional to:

$$P(t)=P1+P2+2*\sqrt{(P1P2)}\cos(\phi 1-\phi 2) \quad (2)$$

where $P_n$ is the power incident to the photodetector from a particular arm (1 or 2) and $\phi_n$ is the phase of the light from the particular arm of the interferometer. Photodetector assembly 320 may transmit the electrical signal to information handling system 120, which may process the electrical signal to identify strains within fiber optical cable 106 and/or convey the data to a display and/or store it in computer-readable media. Photodetector assembly 320 and information handling system 120 may be communicatively and/or mechanically coupled. Information handling system 120 may also be communicatively or mechanically coupled to pulse generator 302.

Modifications, additions, or omissions may be made to FIG. 3 without departing from the scope of the present disclosure. For example, FIG. 3 shows a particular configuration of components of DAS system 104. However, any suitable configurations of components may be used. For example, pulse generator 302 may generate a multitude of coherent light pulses, optical pulse 324, operating at distinct frequencies that are launched into the sensing fiber either simultaneously or in a staggered fashion. For example, the photo detector assembly is expanded to feature a dedicated photodetector assembly for each light pulse frequency. In examples, a compensating interferometer may be placed in the launch path (i.e., prior to traveling down fiber optical cable 106) of the interrogating pulse to generate a pair of pulses that travel down fiber optical cable 106. In examples, interferometer 308 may not be necessary to interfere the backscattered light 326 from pulses prior to being sent to photo detector assembly. In one branch of the compensation interferometer in the launch path of the interrogating pulse, an extra length of fiber not present in the other branch (a gauge length similar to gauge 314) may be used to delay one of the pulses. To accommodate phase detection of backscattered light 326 using DAS system 104, one of the two branches may include an optical frequency shifter (for example, an acousto-optic modulator) to shift the optical frequency of one of the pulses, while the other may include a gauge. This may allow using a single photodetector receiving the backscatter light to determine the relative phase of the backscatter light between two locations by examining the heterodyne beat signal received from the mixing of the light from different optical frequencies of the two interrogation pulses.

Gauge 314 may have a selected gauge length, which may be chosen by personnel. Gauge length allows the comparison of the stretching of the fiber optic cable 106 at a fixed offset for each channel. Thus, the seismic measurement for each channel is derived from the phase difference in the optical backscattered signal at the location of the channel and at a location a distance of the gauge length away from that channel. Unfortunately, the gauge length itself imparts a spectral filtering to the seismic data. The shape of the spectral filter is a function of two factors which are the gauge length and the apparent, incident seismic velocity of the wave being propagated. Thus, acquiring DAS VSP data using a selected gauge, the seismic data acquired will vary in spectral content as a function of depth because of the velocity of rocks interacting with the gauge length.

The loss of seismic energy of a wave propagating in subterranean formation 118 (e.g., referring to FIG. 1). may be caused by many factors including: the spherical spreading of the wavefront, reflection and transmission losses across formation boundaries, scattering of the wave by large heterogeneities on its path like vugs and karsts, and also the intrinsic seismic attenuation of the formation rock. The intrinsic seismic attenuation of a rock is also called anelastic attenuation and refers to the losses of energy primarily from heat losses to friction between the motion of the fluid flow of water, gas, and hydrocarbons in the formation against the grain boundaries of the rock. Well consolidated vacuum dry rocks have very low attenuation (and high Q values) while unconsolidated rocks containing fluids have high attenuation (and low Q values). This effect challenges the extraction of intrinsic seismic attenuation measurements because the extraction process assumes that the only change in the spectral content of the seismic data will be caused by the absorption of the seismic energy, typically through heat loss, by the rock itself. As disclosed, DAS VSP is used to extract attenuation of the rocks, an added contribution of gauge 314 and seismic velocity must be removed before an accurate value of attenuation may be derived.

A VSP recording has a measurement of the seismic wavefield at multiple depth levels in wellbore 102 (e.g., referring to FIG. 1). A DAS VSP is typically recorded with depth intervals ranging from 0.25 m to 8 m apart. Generally, the depth spacing is 1 m. Each one of these depth measurements in a DAS VSP is called a trace that includes a time series of values representing the strain or strain rate of fiber optic cable 106 (e.g., referring to FIG. 1 or 2) over the time window of the measured signal. (Note the raw, unprocessed signal may measure the phase of the detected light, which is ultimately converted to strain and strain rate via standard conversion factors.) Typical time sampling intervals of each trace before processing is about 0.1 ms. After processing by filtering and re-sampling the time sampling interval is typically between 1 and 2 ms. A formula for the gauge effect upon the spectrum of a DAS VSP trace may be computed analytically. Careful measurements of the Q factor (which is defined as the inverse attenuation) may, in theory, be made for two traces, one located at the top and the other at the bottom of subterranean formation 118 (e.g., referring to FIG. 1). Since the gauge length used is the same and the velocity of the formation is the same there is no needed correction for the gauge effect. A simple spectral ratio method may be used to extract Q. However, in general the value of Q is desired at many points along the length of wellbore 102 (e.g., referring to FIG. 1). However, identifying zones, or layers, of constant velocity along the wellbore to use the method may be impractical. Thus, it is important to be able to extract the Q (or inverse attenuation) between traces located at arbitrary positions in wellbore 102 with different local velocities.

Figure 4:
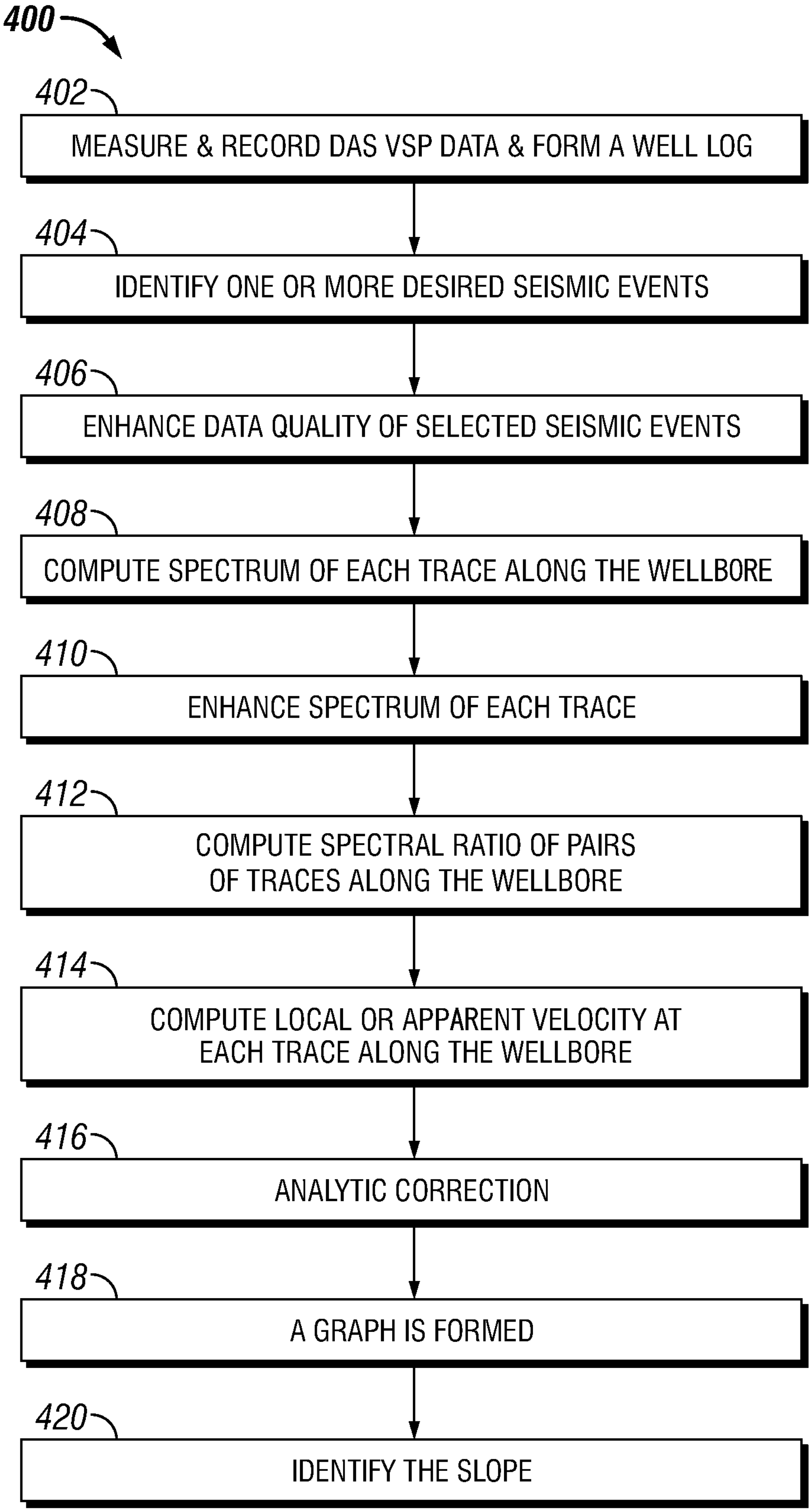
FIG. 4 is a workflow for finding Q.

The method is described as workflow 400 in FIG. 4. In examples, workflow 400 may be performed on information handling system 120 (e.g., referring to FIG. 1). Workflow 400 may begin with block 402. In block 402, DAS VSP data in measured and recorded in a wellbore 102 (e.g., referring to FIG. 1). From the measurements a well log is formed.

In block 404, the well log formed in block 402 is analyzed to identify one or more desired seismic events for study. After a seismic source 142 (e.g., referring to FIG. 1) is activated and the recording system begins to record the DAS VSP data using DAS system 104 (e.g., referring to FIG. 1), an entire seismic record is recorded which has many traces, each located at regular spaced apart intervals in depth. Each trace has a time length of usually 4 to 30 seconds. The VSP record may comprise all the seismic waves which passed by wellbore 102 (e.g., referring to FIG. 1) at each sensor (channel or trace) depth. These waves may include P waves, S waves, Tube waves, and sometimes undesirable waves including reverberations of the casing, production tubing, and wireline in wellbore 102. P waves are seismic events comprising compressional wave body motion with the particle motion aligned parallel to the propagation direction. Historically they were named P waves because they are the fastest, or primary (first) wave seen on a seismic record. S waves are shear waves where the particle motion is aligned perpendicular to the propagation direction. Historically they have been called secondary waves because they are slower than the P wave, and thus arrive later. There will be many P- and S-wave events on a VSP record because of seismic energy which is refracted through, reflected off, and scattered off of formation boundaries throughout the entire subsurface. Because the P waves are the fastest propagating seismic wave, the first in time seismic wave seen at each trace, corresponding to different depths, will be a P wave which is frequently called the "first break" or "first arrival". A tube wave is a particular type of seismic wave that is trapped inside wellbore 102. It is typically generated when seismic energy hits the well head and is then trapped by the geometry of the fluid (liquid) in wellbore 102 and propagates down and up wellbore 102 at a speed which is slightly less than the fluid velocity of the liquid in wellbore 102.

Frequently, for the below described operation, a first arrival wave is selected because it is easy to identify and isolate. Other selected waves that may be identified and isolated are P waves, S waves, or Tube waves. Attenuation is usually measured as the loss of energy in a specific single type of wave, such as a P wave. To perform the estimate of the attenuation of this wave, it is isolated on the traces and measured at two different depths in wellbore 102 (e.g., referring to FIG. 2). Then the loss of the energy between these two measurements is estimated from the shift in the spectral content of the two waves.

However, it is also possible to measure attenuation between two different wave types. For example, a P wave incident on the top of a formation will be transformed into at least 4 waves: 1) an upgoing reflected P wave, 2) an upgoing converted (reflected) S wave, 3) a down going transmitted (refracted) P wave, and 4) and down going converted (refracted) S wave. (It is also possible there may be a critically refracted P and S waves that travel along the formation bed boundary). In examples, measurement of attenuation of seismic energy between, for example, an incident down going P wave and the down going converted (refracted) S wave may be found. In the cases with two different wave types, compensation needs to be made for the transmission coefficient in order to extract the attenuation value. Thus, the formation attenuation properties may be extracted from any combination of incident wave (P- or S-wave) and the reflected events (P- or –S-wave) or transmitted (refracted) wave (P- or S-wave).

After identifying one or more seismic events in block 404, the identified seismic event is isolated in the well log. This may be performed by applying a tapered windowing function, which captures one cycle of energy during a seismic event. The tapered windowing function may be performed manually or automatically. Tapered windowing functions may include, but are not limited to, a simple box car, Tukey window, Hanning window, Hamming window, Raised Cosine window, and/or the like. The tapered windowing function edits out unwanted data for the well log and specifies an identified piece of the well log for further evaluations.

In block 406, the data quality of the of the selected wave data may be enhanced. Enhancement may be performed by utilizing a running average of side-by-side traces. The running average may be a mean or medium average. Additionally, a band pass filter, which may be applied to each trace to remove low frequency shift in the data selected in block 404, may be utilized. This enhancement stabilizes the selected traces for further processing. Stabilizing the traces may include removing noise from the data to create a representative waveform for a specified depth.

In block 408, a spectrum for each trace along wellbore 102 (e.g., referring to FIG. 1) is computed. The spectrum for each trace is performed by performing a Fast Fourier Transform (FFT) of the trace at the measured depth of the trace. In examples, other mathematical operations may be used other than an FFT. For example, periodigram, Bartlett's method, Welch's method, short term Fourier transform, autoregressive model, moving average model, autoregressive moving average, Multiple Signal Classification (MUSIC), maximum entropy, and Pisarenko's method, and/or the like. The results from the FFT gives a complex number for each frequency. The absolute value of each complex number is used for further processing.

In block 410, the spectrum of each trace is enhanced. Enhancement of the spectrum may be performed by smoothing mathematical operations. These operations may be similar to the mathematical operations in block 406. Enhancement may be performed by utilizing a running average of side-by-side spectrums. The running average may be a mean or medium average. Additionally, a band pass filter, which may be applied to each spectrum to remove low frequency shift in the data selected in block 404, may be utilized.

In block 412, the spectral ratio of pairs of traces all along wellbore 102 (e.g., referring to FIG. 1) is computed. A trace is a measurement that may be taken by DAS system 104 (i.e., referring to FIG. 1) at every meter, generally. However, traces may be chosen at larger distances from each other, such as 15 meters or greater. The larger the distance between traces, the less deleterious effect any noise present makes on the measurements. To form a spectral ratio of trace pairs, the output from block 410 is a spectrum for each trace. To determine a ratio, pairs of spectra are selected, and each are divided one by the other. Ratio spectral samples are created between the spectra at each of the chosen two depths.

In block 414, a local or apparent velocity at each trace along wellbore 102 (e.g., referring to FIG. 1) is computed or obtained. The apparent velocity is found by identifying arrival times for each trace by identifying the move out, or the arrival time differences, of the trace as a function of depth to determine velocity of the trace for a seismic event. When the seismic source is offset from the well head, or wellbore 102 (e.g., referring to FIG. 1) is deviated with respect to vertical, a correction may need to be made to the actual formation velocity, if an established velocity well log is used for example, to adjust the actual formation velocity to be the apparent velocity taking into consideration the angle of incidence of the seismic wave to wellbore 102. In other examples, other established well logs may be used as well as measured surface seismic velocity for vertical wells with a source located near the well head with out the need to convert the actual velocity to an apparent velocity since they are the same.

In block 416, an analytic correction is computed for the gauge and corresponding velocities at depths of the two traces and apply the correction to their corresponding spectral ratio. This operation and how it functions are discussed below in reference to FIG. 7 and Equations 11-13.

Figures 5A, 5B, 5C, 5D, 5E, 5F, 5G:
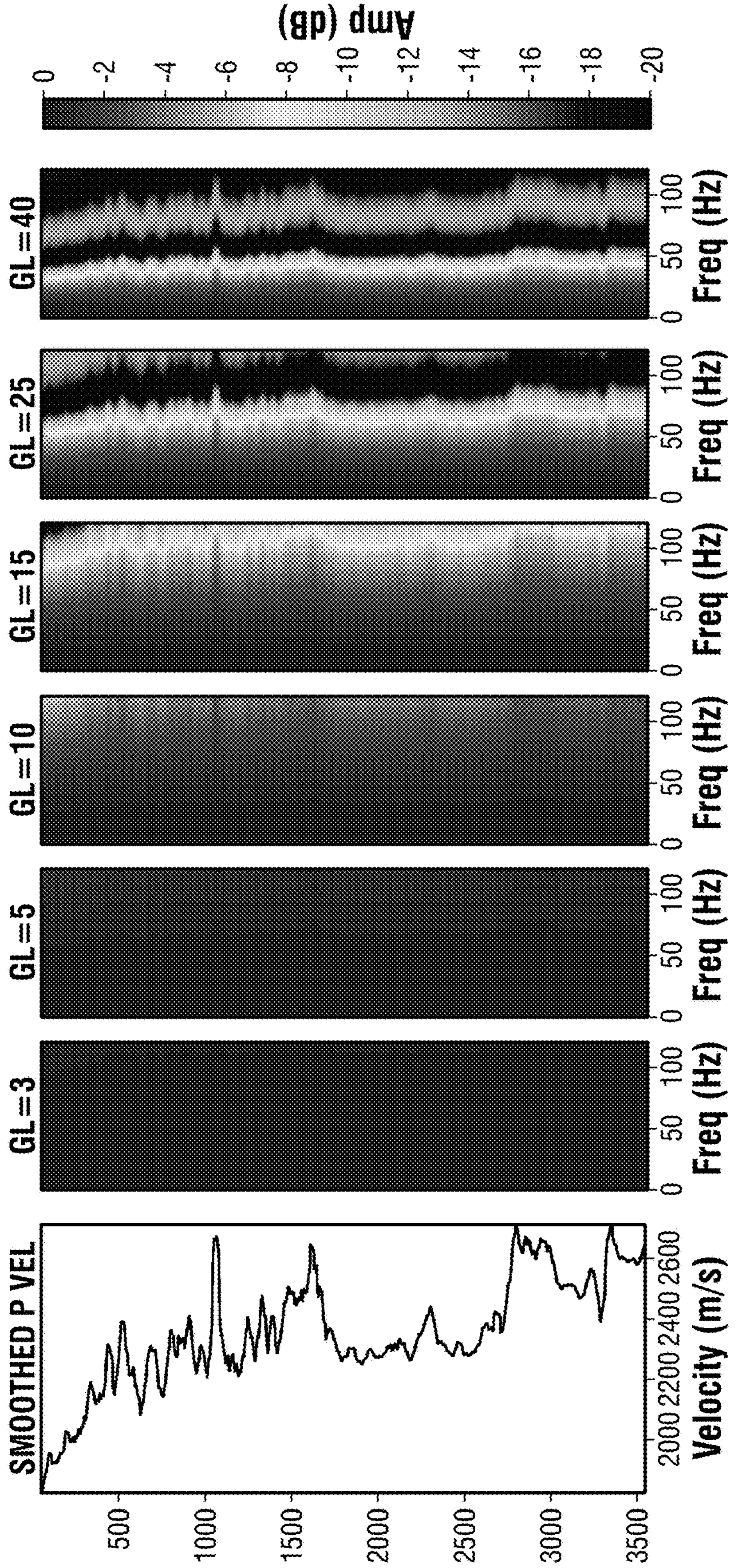
FIGS. 5A-5G illustrate spectral losses with different gauge lengths in a well log using color.

In block 418, a graph is formed from the data in block 416. Fit a straight line in the graph, see below in reference to FIG. 8, to the spectral ratio over a zone of the spectrum containing valid data, which is guided by avoiding the predicted notches in the spectra from the gauge effect. Gauge length helps select which frequencies the line will be drawn for. In examples, a frequency band may be selected which may be lower than the notch formed in the spectrum from gauge 314 (i.e., referring to FIG. 3). FIGS. 5E-5G, further discussed below, show the notch formed from gauge 314. As illustrated in FIGS. 5E-5G, in a theoretical response, the notch is seen above about 100 Hz with a 15 m gauge length, about 75 Hz with a 25 m gauge length, or about 50 Hz with a 40 m gauge length.

In block 420, the slope of the straight line is converted to the value of Q between the traces. This operation may be performed utilizing Equation 10, discussed below. Slope is found utilizing πft/Q, which is discussed in greater detail below.

Alternatively, the Q may be computed between the same depth channel in a time lapse survey of the same well. For examples, at a first time, a FiberVSP (DAS VSP) survey is acquired in a wellbore 102 (e.g., referring to FIG. 1). At a second time, typically after hydraulic fracturing or production has occurred, a second FiberVSP (DAS VSP) data set is acquired from wellbore 102. An attenuation between the two surveys for the same depth is determined using workflow 400. In portions of wellbore 102 with no changes, no attenuation may have occurred, which gives a very large (i.e., a numerical value that is 300 or greater) or infinite value of Q. In zones where there has been changes in the rock properties, losses in the seismic energy may be present and thus smaller Q values (higher attenuation) may be seen. For a time lapse survey, the gauge length used to acquire the data may have changed as different DAS systems 104 (e.g., referring to FIG. 1) may have been used for each measurement. Thus, the correction may now include the corresponding velocity and gauge lengths for each survey.

Discussed below is the mathematical flow of workflow 400 (e.g., referring to FIG. 4). To begin, the analytic gauge length effect on the seismic spectrum is given by:

$$A(K, L) = \frac{\sin(\pi KL)}{\pi KL} = \mathrm{sinc}(KL) = \mathrm{sinc}\left(\frac{fL}{v}\right) \tag{3}$$

where A is the amplitude response of the gauge length, K is the wavenumber, L is the gauge length, f is frequency, and v is the apparent velocity of the formation at the channel in question.

Additionally, $$f\ \lambda = v \tag{4}$$

$$K = \frac{1}{\lambda} \tag{5}$$

-continued thus $$K = \frac{f}{v} \quad (6)$$

where λ is the seismic wavelength.

FIGS. 5A-5G shows the theoretical spectral losses for 6 different gauge lengths over a depth range in wellbore 102 (e.g., referring to FIG. 1). As illustrated, significant losses start to appear at frequencies above 75 Hz for 25 m and 40 m gauges. This analysis is for a zero offset VSP, where the velocity profile shown is actually the velocity of the waves that are measured by DAS system 104 (e.g., referring to FIG. 1). For offset VSPs, the seismic energy measured by DAS system 104 may be traveling at the apparent velocity which may be faster than the true formation velocity. Thus, the effect of gauge 314 may be worse for zero offset VSPs than for offset VSPs.

FIGS. 6A-6F presents the same information as FIG. 1, except using contour lines instead of color to represent the losses for 5 m, 10 m, 15 m, 25 m, and 40 m gauge lengths. These plots graphically show that even though the actual seismic signal may have the same spectral content, the effect of gauge 314 (e.g., referring to FIG. 3) may alter the frequency content of each channel differently because of the changing formation velocities. Therefore, the spectral ratio of two seismic signals, $A_1$ and $A_2$, at two depths, without intrinsic seismic attenuation, would have the shape of:

$$\frac{A_2}{A_1} = \frac{\frac{\sin(\pi K_2 L)}{\pi K_2 L}}{\frac{\sin(\pi K_1 L)}{\pi K_1 L}} = \frac{K_1 \sin(\pi K_2 L)}{K_2 \sin(\pi K_1 L)} = \frac{v_2 \sin(\pi L f / v_2)}{v_1 \sin(\pi L f / v_2)} \quad (7)$$

Figure 7:
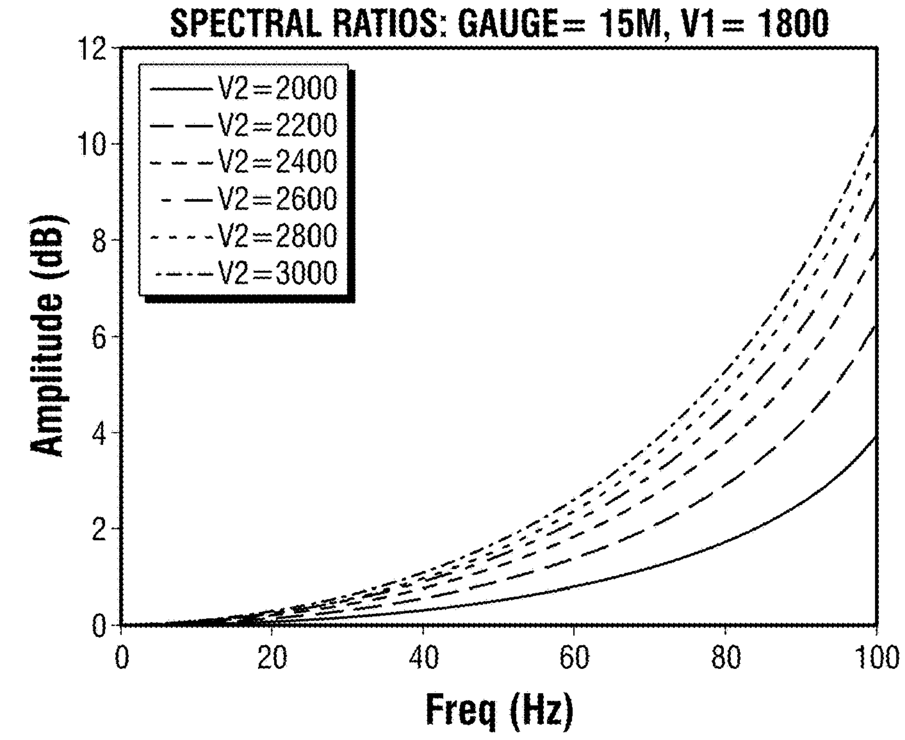
FIG. 7 is a graph of a gauge if the reference $A_1$ signal has a local velocity of 1800 m/s and the $A_2$ signal channel has a range of velocities from 2000 to 3000 m/s.

FIG. 7 shows the effect of gauge 314 (e.g., referring to FIG. 3) if the reference $A_1$ signal has a local apparent velocity of 1800 m/s and the $A_2$ signal channel has a range of apparent velocities from 2000 to 3000 m/s. Measuring the attenuation between these two signals, a negative attenuation value (i.e., a signal that appears to be growing in high frequencies as it propagates) is found. Thus, the spectral ratio plot may be corrected by applying the "inverse" of the amplitude effect of the gauge and different apparent velocities from Equation (7).

Seismic attenuation is modeled as:

$$A_{attenuated} = A_{full} G e^{-\pi f t / Q} \quad (8)$$

where $A_{full}$ represents the input or not attenuated signal, G is the spherical spreading factor, f is frequency, t is the propagation time between the two locations, and Q is the attenuation quality factor. Additionally, $A_{attenuated}$ is the attenuated signal by intrinsic seismic absorption in the rock.

Thus, when estimating the attenuation, the spectral ratios of two signals at two different locations are computed giving:

$$\text{Ratio} = \frac{A_{attenuated}}{A_{full}} = G\, e^{-\pi f t / Q} \quad (9)$$

Taking the log base e of both sides of the equation gives:

$$\log_e(\text{ratio}) = -\frac{\pi \text{ft}}{Q} + G \quad (10)$$

From Equations (9) and (10), a straight line may be formed, falling with frequency in the log spectral ratio plots.

FIG. 7 is a graph that shows plots of the expected $\log_e$ of the spectral ratio comparing two signals without the gauge length effect, at two locations which are separated in time by 0.250 sec, the intrinsic Q=50, and no spreading, i.e., G=0. It is a simple line indicating no effect of the velocity term on the slope of the line.

However, if the signal has been recorded by DAS system 104 (e.g., referring to FIG. 1) using a gauge 314 (e.g., referring to FIG. 3) then the spectral ratio will be:

$$\text{Ratio} = \frac{A_{attenuated}}{A_{full}} = G\, e^{-\pi f t / Q} \frac{v_2 \sin(\pi L f / v_2)}{v_1 \sin(\pi L f / v_2)} \quad (11)$$

Taking the $\log_e$ of Equation (11) gives:

$$\log_e(\text{ratio}) = \log_e(G) - \frac{\pi \text{ft}}{Q} + \log_e\left(\frac{v_2}{v_1}\right) + \log_e\left(\frac{\sin\left(\frac{\pi L f}{v_2}\right)}{\sin\left(\frac{\pi L f}{v_1}\right)}\right) \quad (12)$$

Combining terms, the following is produced:

$$\log_e(\text{ratio}) = \log_e\left(\frac{\sin\left(\frac{\pi L f}{v_2}\right)}{\sin\left(\frac{\pi L f}{v_1}\right)}\right) - \frac{\pi \text{ft}}{Q} + c \quad (13)$$

where c is a constant.

Figure 8:
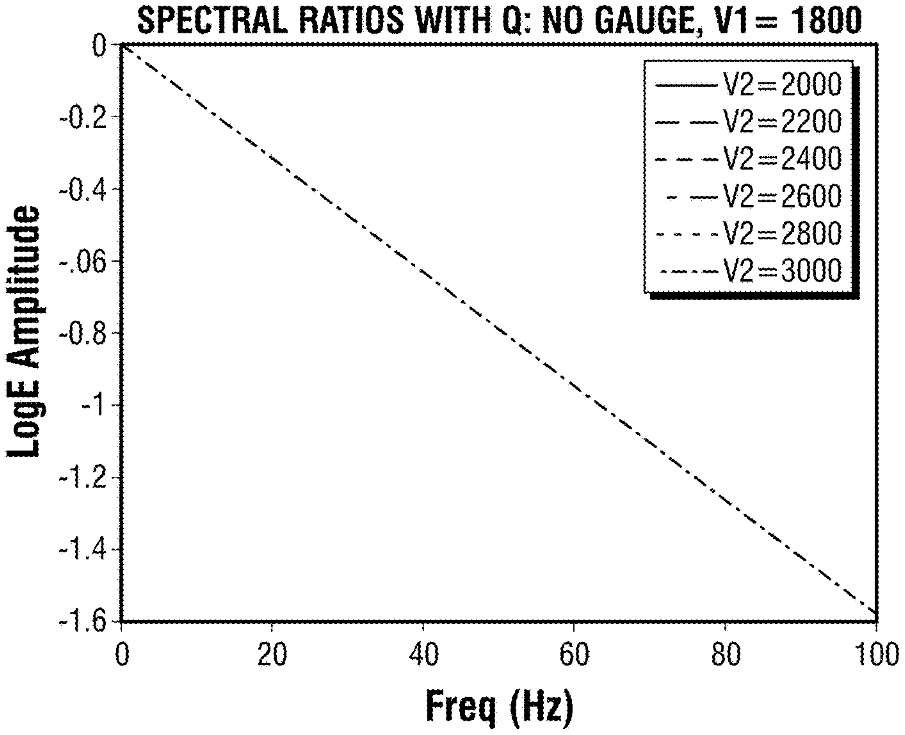
FIG. 8 is a graph showing the combined effect of the gauge and attenuation, where Q=50, and the time delay between channels (receivers) is 0.25 sec.

FIG. 8 is a graph that shows the combined effect of gauge 314 (e.g., referring to FIG. 3) and attenuation, where Q=50, and the time delay between channels (receivers) is 0.25 sec. Note the spherical spreading was ignored and the other constant term associated with the log of the velocity ratios is also ignored. The combination of gauge 314 and velocity has an effect on the ratio. This should be corrected before an accurate Q may be computed.

Figure 9:
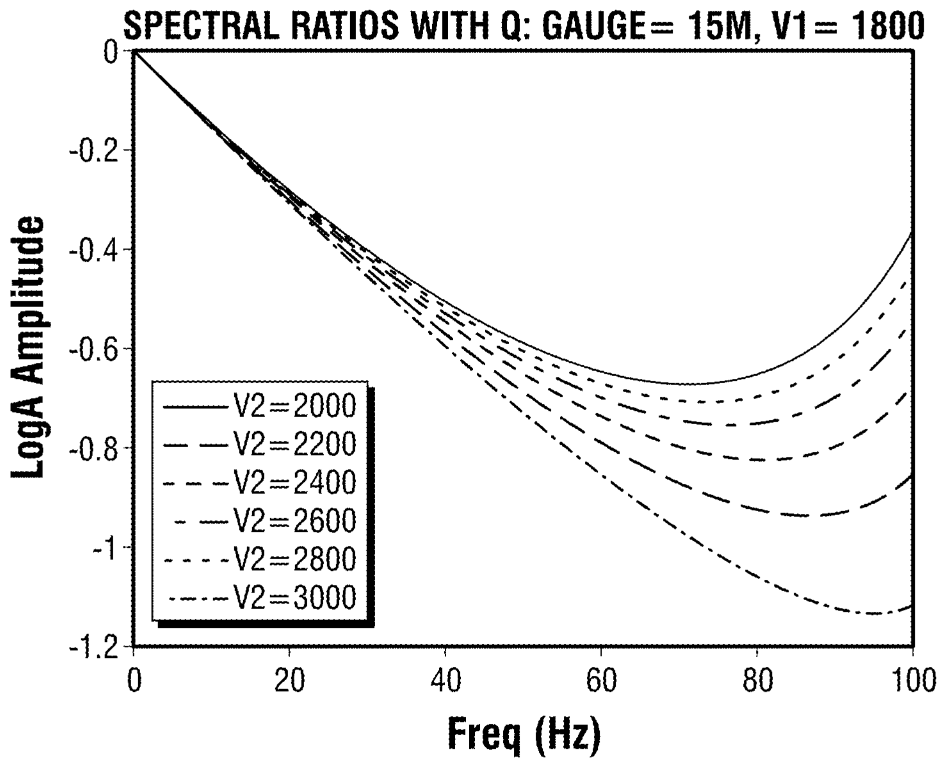
FIG. 9 is a graph with a gauge length effect that may be corrected before an accurate Q may be computed.

From FIG. 9 is a graph of the gauge length effect may be corrected before an accurate Q may be computed. This may be done by using Equation (13) to correct the amplitudes for each trace—similar to spectral balancing, but using the exact, deterministic equation to estimate the spectral losses given the formation velocity and the gauge. Additionally, another computation may utilize Equation (13) to correct the amplitudes of the spectral ratios before the estimate of Q is made.

Current technology is not able to compute attenuation from seismic data as the losses are over a short distance, which correspond to a few wavelengths. Thus, accurately detecting and characterizing the losses is difficult at measurements may be sensitive to noise and gauge length biases. As describe above, improvements over current technology include identifying the spectral distortion caused by the gauge length of a gauge in an interferometer and the formation velocity. Utilizing the values of the gauge length and the velocity at two channels allows for correction of the spectral content of traces at these two channels. This allows for the creation of an accurate and reliable intrinsic attenuation value, which was previously not attainable with current technology.

The preceding description provides various examples of the systems and methods of use for identifying the location of one or more distributed acoustic channels in a multi-dimensional model interface. Disclosed below are various method steps and alternative combinations of components.

Statement 1: A method may comprise measuring one or more seismic events with a distributed acoustic sensing (DAS) system to form a well log, wherein the well log comprises one or more traces. The method may further comprise isolating a first seismic event with a tapered windowing function, performing a spectral ratio of two or more pairs of traces in the well log, identifying a velocity at each of the one or more traces in the well log, identifying an analytic correction for a gauge of the DAS system and the velocity for each of the one or more traces in the well log, and applying the analytic correction to the spectral ratio to form a corrected spectral ratio. Additionally, the method may include, identifying a slope of the corrected spectral ratio for at least a part of the well log, converting the slope to a Q value, and identifying one or more formation properties in a formation from the Q value.

Statement 2: The method of statement 1, further comprising enhancing a data quality of the first seismic event.

Statement 3: The method of statements 1 or 2, further comprising identifying a spectrum for each of the one or more traces in the well log.

Statement 4: The method of statement 3, wherein the spectrum is found performing a Fast Fourier Transform (FFT) for each of the one or more traces.

Statement 5: The method of statements 3 or 4, wherein the spectrum is found performing a periodigram, Bartlett's method, Welch's method, a short term Fourier transform, an autoregressive model, a moving average model, an autoregressive moving average, a Multiple Signal Classification (MUSIC), maximum entropy, or Pisarenko's method for each of the one or more traces.

Statement 6: The method of statements 3, 4, or 5, further comprising enhancing the spectrum.

Statement 7: The method of statements 1, 2, or 3, wherein the first seismic event is a first arrival wave, a P wave, a S wave, or a Tube wave.

Statement 8. The method of statements 1-3 or 7, wherein the tapered windowing function is a simple box car, a Tukey window, a Hanning window, a Hamming window, or a Raised Cosine window.

Statement 9. The method of statements 1-3, 7, or 8, further comprising disposing the DAS system into a wellbore.

Statement 10: The method of statements 1-3 or 7-9, wherein the slope if found using $\pi ft/Q$, wherein f is frequency, t is a propagation time between two locations, and the Q value is an attenuation quality factor.

Statement 11: A system may comprise a fiber optic cable disposed in a wellbore, an interrogator connected to the fiber optic cable and wherein the interrogator includes a gauge, and an information handling system connected to the interrogator. The information handling system may be configured to form a well log from one or more traces of one or more seismic events taken along the fiber optic cable, isolate a first seismic event with a tapered windowing function, perform a spectral ratio of two or more pairs of traces in the well log, identify a velocity at each of the one or more traces in the well log, identify an analytic correction for the gauge and the velocity for each of the one or more traces in the well log, and apply the analytic correction to the spectral ratio to form a corrected spectral ratio. Additionally, the information handling system may be configured to identify a slope of the corrected spectral ratio for at least part of the well log, convert the slope to a Q value, and identify one or more formation properties in a formation from the Q value.

Statement 12: The system of statement 11, wherein the information handling system is further configured to enhance a data quality of the first seismic event.

Statement 13: The system of statements 11 or 12, wherein the information handling system is further configured to identify a spectrum for each of the one or more traces in the well log.

Statement 14: The system of statement 13, wherein the spectrum is found performing a Fast Fourier Transform (FFT) for each of the one or more traces.

Statement 15: The system of statements 13 or 14, wherein the spectrum is found performing a periodigram, Bartlett's method, Welch's method, a short-term Fourier transform, an autoregressive model, a moving average model, an autoregressive moving average, a Multiple Signal Classification (MUSIC), maximum entropy, or Pisarenko's method for each of the one or more traces.

Statement 16: The system of statements 13, 14, or 15, wherein the information handling system is further configured to enhance the spectrum.

Statement 17: The system of statements 11, 12, or 13, wherein the first seismic event is a first arrival wave, a P wave, a S wave, or a Tube wave.

Statement 18: The system of statements 11-13 or 17, wherein the tapered windowing function is a simple box car, a Tukey window, a Hanning window, a Hamming window, or a Raised Cosine window.

Statement 19: The system of statements 11-13, 17, or 18, wherein each of the one or more traces are spaced one meter or more apart on the fiber optic cable.

Statement 20: The system of statements 11-13 or 17-19, wherein the slope if found using $\pi ft/Q$, wherein f is frequency, t is a propagation time between two locations, and the Q value is an attenuation quality factor.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:

measuring one or more seismic events with a distributed acoustic sensing (DAS) system in a subterranean formation at a first time to form a well log, wherein the DAS system utilizes a fiber optic cable configured to transport light to and from a surface, wherein the light is altered by the one or more seismic events and the DAS system forms the well log based at least in part on the altered light;

determining a Q value based at least on the one or more seismic events, comprising:

isolating a first seismic event with a tapered windowing function to identify a plurality of traces that measure the first seismic event, the tapered windowing function comprising one of a simple box car, Tukey window, Hanning window, Hamming window, and a Raised Cosine window;

computing a spectral ratio from a pair of the plurality of traces in the well log;

computing a velocity for each of the plurality of traces in the well log;

identifying an analytic correction for a gauge of the DAS system and the velocity for the computed spectral ratio in the well log;

applying the analytic correction to the computed spectral ratio to form a corrected spectral ratio, wherein the analytic correction is based at least in part on an apparent velocity or a gauge length;

identifying a slope of the corrected computed spectral ratio for at least a part of the well log; and converting the slope to determine the Q value;

identifying one or more properties of the subterranean formation based on at least on the Q value, conducting one or more drilling operations at the subterranean formation based on the identified one or more properties;

conducting a time lapse survey of the subterranean formation to determine a subsequent Q value, wherein determining the subsequent O value comprises, measuring one or more additional seismic events with another DAS system at a second time; and identifying a subsequent analytic correction based at least in part on a corresponding velocity, a corresponding gauge length, or both; and detecting a change in the one or more properties based on the Q value, the subsequent Q value, or both, wherein the change is associated with the one or more drilling operations.

2. The method of claim 1, further comprising enhancing a data quality of the first seismic event.

3. The method of claim 1, further comprising identifying a spectrum for each of the plurality of traces in the well log.

4. The method of claim 3, wherein the spectrum is found performing a Fast Fourier Transform (FFT) for each of the one or more traces.

5. The method of claim 3, wherein the spectrum is found performing a periodigram, Bartlett's method, Welch's method, a short term Fourier transform, an autoregressive model, a moving average model, an autoregressive moving average, a Multiple Signal Classification (MUSIC), maximum entropy, or Pisarenko's method for each of the one or more traces.

6. The method of claim 3, further comprising enhancing the spectrum.

7. The method of claim 1, wherein the first seismic event is a first arrival wave, a P wave, a S wave, or a Tube wave.

8. The method of claim 1, further comprising disposing the DAS system into a wellbore.

9. The method of claim 1, wherein the slope if found using $\pi ft/Q$, wherein f is frequency, t is a propagation time between two locations, and the Q value is an attenuation quality factor.

10. A system comprising:

a fiber optic cable disposed in a wellbore in a subterranean formation and configured to take one or more measurements of one or more seismic events;

an interrogator connected to the fiber optic cable and wherein the interrogator includes a gauge; and an information handling system connected to the interrogator and configured to:

form a well log from one or more measurements of the one or more seismic events taken along the fiber optic cable;

isolate a first seismic event with a tapered windowing function to identify a plurality of traces that measure the first seismic event, the tapered windowing function comprising one of a simple box car, Tukey window, Hanning window, Hamming window, and a Raised Cosine window;

compute a spectral ratio from a pair of the plurality of traces in the well log;

identify a velocity for each of the plurality of traces in the well log;

identify an analytic correction for the gauge and the velocity for the computed spectral ratio in the well log;

apply the analytic correction to the computed spectral ratio to form a corrected spectral ratio, wherein the analytic correction is based at least in part on an apparent velocity or a gauge length;

identify a slope of the corrected computed spectral ratio for at least part of the well log;

determine a Q value, wherein determining the Q value comprises converting the slope;

produce a seismic tomographic model of the subterranean formation based at least on the Q value; and use the seismic tomographic model to monitor a reservoir associated with the subterranean formation over a period of time.

11. The system of claim 10, wherein the information handling system is further configured to enhance a data quality of the first seismic event.

12. The system of claim 10, wherein the information handling system is further configured to identify a spectrum for each of the one or more traces in the well log.

13. The system of claim 12, wherein the spectrum is found performing a Fast Fourier Transform (FFT) for each of the one or more traces.

14. The system of claim 12, wherein the spectrum is found performing a periodigram, Bartlett's method, Welch's method, a short-term Fourier transform, an autoregressive model, a moving average model, an autoregressive moving average, a Multiple Signal Classification (MUSIC), maximum entropy, or Pisarenko's method for each of the one or more traces.

15. The system of claim 12, wherein the information handling system is further configured to enhance the spectrum.

16. The system of claim 10, wherein the first seismic event is a first arrival wave, a P wave, a S wave, or a Tube wave.

17. The system of claim 10, wherein each of the one or more traces are spaced one meter or more apart on the fiber optic cable.

18. The system of claim 10, wherein the slope if found using $\pi ft/Q$, wherein f is frequency, t is a propagation time between two locations, and the Q value is an attenuation quality factor.

* * * * *